United States Patent
Waldron

[15] 3,699,800
[45] Oct. 24, 1972

[54] TEMPERATURE CALIBRATION SYSTEM

[72] Inventor: Bradley C. Waldron, Los Angeles, Calif.

[73] Assignee: King Nutronics Corporation, Van Nuys, Calif.

[22] Filed: March 4, 1971

[21] Appl. No.: 120,818

[52] U.S. Cl. .................................................73/1 F
[51] Int. Cl. ............................................G01k 15/00
[58] Field of Search .........................................73/1 F

[56] References Cited

UNITED STATES PATENTS

| | | | |
|---|---|---|---|
| 2,535,083 | 12/1950 | Martin | 73/1 F |
| 2,854,844 | 10/1954 | Howell | 73/1 F |
| 3,245,248 | 4/1966 | Ritter | 73/1 F |

Primary Examiner—S. Clement Swisher
Attorney—Harris, Kiech, Russell & Kern

[57] ABSTRACT

An apparatus for calibrating temperature probes such as thermometers and thermocouples. A small portable unit which is dry and tiltable and which provides a plurality of set points for calibration of several instruments at one time or calibration at several different temperatures in sequence. A plug-in well with a removable metal heat sink within a vacuum bottle has an electric resistance heater for the heat sink controlled by a temperature sensitive thermistor in the sleeve between the heater and the heat sink. The operating temperature of each well may be preset ad may be adjusted as desired. A readout circuit operating from another temperature sensitive thermistor in the sleeve provides a direct indication of well temperature throughout the temperature operating range. The readout circuit provides an expanded scale indication of temperature and compensates for the highly nonlinear temperature characteristic of the thermistor.

10 Claims, 4 Drawing Figures

PATENTED OCT 24 1972

INVENTOR
BRADLEY C. WALDRON
BY HIS ATTORNEYS
HARRIS, KIECH, RUSSELL & KERN

TEMPERATURE CALIBRATION SYSTEM

This invention relates to dry well temperature test systems and to systems particularly designed for on site testing and calibration of temperature sensitive devices such as thermocouples, thermo switches, thermistors, temperature control systems, and temperature indicators. The system of the invention is particularly well suited for use with remote indicating controls in instrumentation systems.

The apparatus of the invention incorporates electrically heated, dry temperature wells, eliminating the molten salt and hot oil baths of the prior art devices and the attendant dangers and limitations on operating locations, operating positions, and portability. It is an object of the invention to provide such a new and improved temperature test system. A further object is to provide a test system with temperature wells for direct plug in of the temperature probe, without requiring disconnection of associated capillary tubes or electrical wiring.

It is an object of the invention to provide such a temperature test system having a fast response time, typically reaching a stabilized temperature in less than 30 minutes from a cold start. A further object is to provide such a test system which can be operated over a wide range, typically 150° to 600° F., with the specific operating temperature being adjustable and being highly accurate, typically within 0.1 percent of set point.

It is an object of the invention to provide such a test system incorporating removable heat sinks which may be interchanged to accommodate a wide range of temperature probes while maintaining maximum heat transfer and high accuracy. A further object is to provide a readout system for indicating the temperature of the well, with the readout system including a meter providing a linear indication of a portion of the temperature range, with the readout circuitry providing compensation for the highly nonlinear operation of the temperature sensing elements over the operating range of the system.

Other objects, advantages, features and results will more fully appear in the course of the following description. The drawings merely show and the description merely describes a preferred embodiment of the present invention which is given by way of illustration or example.

Figure 1:
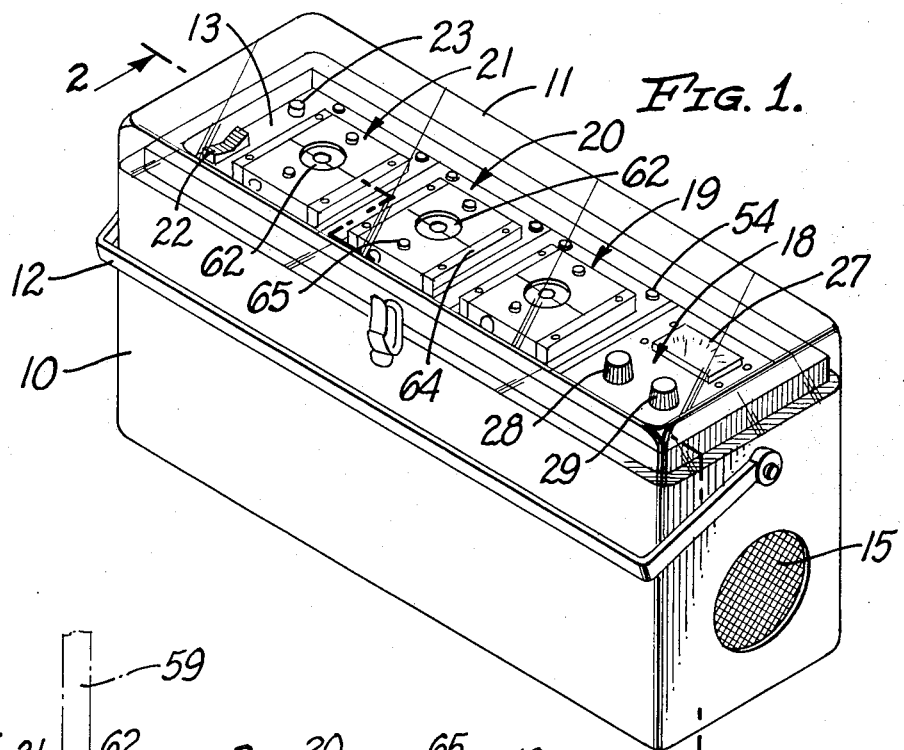
FIG. 1 is a perspective view of a portable dry well temperature test system incorporating a preferred embodiment of the present invention.

The instrument shown in the drawings includes a housing 10 with a cover 11 and a handle 12. A panel 13 is carried at the top of the housing and supports the components of the system within the housing. Air flow through the housing is provided by an exhaust fan 14 mounted at an opening at one end of the housing, with a screen 15 enclosing an opening at the opposite end of the housing. A control unit 18 and three wells 19, 20, 21 are mounted in the panel 13. An on-off switch 22 and an indicating light 23 are mounted in the panel 13, and an electric power inlet socket 24 is mounted in the side wall of the housing adjacent the switch 22.

The control unit 18 includes a meter 27, switches 28, 29, an oven 30 carrying a plurality of circuit cards 31, and a plug 32 for connecting the control unit to the wiring harness, indicated generally at 33.

The three wells 19, 20, 21 may be identical and each is designed for ready plug-in and removal, so that one well may be substituted for another. This type of construction is desirable, so that different wells can be preset to different specific operating temperatures. In the specific embodiment illustrated, three wells are utilized, with each designed for a different temperature range. The well 21 (well No. 1) operates in the range of 450° – 600°F., the well 20 (well No. 2) operates in the range of 300° – 450°F., and the well 19 (well No. 3) operates in the range of 150° – 300°F.

Each well includes an elongate, cup-shaped metal sleeve 40 with an electric resistance heater 41 wound thereon, with the sleeve and heater positioned within a thermal insulator in the form of a vacuum bottle 42. A heat transfer casing 43 is positioned around the vacuum bottle insulator and preferably has a plurality of peripheral fins 44 and a bottom block 45 with additional fins 46.

Figure 3:
FIG. 3 is an enlarged partial sectional view taken along the line 3—3 of FIG. 2.

The sleeve 40, insulator 42 and casing 43 are supported from a plate 50 which is attached to another plate 51, with the plate 50 passing through an opening in the panel 13 and with the plate 51 resting on the panel 13, as seen in FIG. 3. The plate 51 is affixed to the panel 13 by screws 54 which are readily accessible from the top of the instrument.

Figure 2:
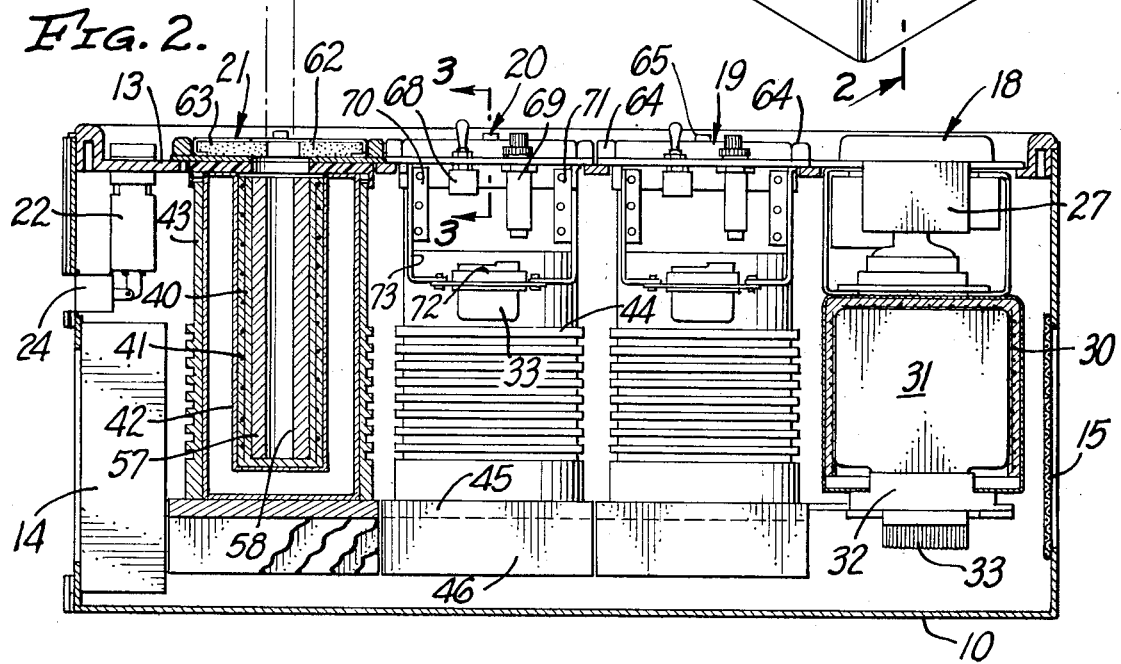
FIG. 2 is an enlarged sectional view taken along the line 2—2 of FIG. 1.

A heat sink 57 in the form of a metal tube is removably positioned within the cavity of the sleeve 40 and is designed to be a sliding fit within the cavity for good heat transfer characteristics. The bore 58 of the heat sink 57 is designed for receiving the temperature probe to be tested, such as a thermometer 59 indicated in phantom lines in FIG. 2. The bore of the heat sink may be tailored to each particular type of temperature probe to be calibrated, with heat sinks being readily interchangeable in the well.

A temperature sensing element 55, such as a thermistor having an electrical resistance that varies with temperature, is mounted in an opening in the sleeve 40 adjacent the upper end. Another similar element 56 is similarly mounted in another opening in the sleeve. The two elements 55, 56 are located between the heater 41 and heat sink 57 and desirably at the same radial position so that the temperatures of the two elements will be the same and will be intermediate that of the heater and the heat sink.

A thermal insulating cover is provided for the well, and typically may comprise blocks 62 of thermal insulating material carried in brackets 63 hinged in supports 64 carried on the plate 51. Semicircular openings may be provided at adjacent edges of the blocks providing clearance for the temperature probe. Bosses 65 on the brackets 63 provide for manual pivoting of the blocks for insertion and removal of heat sinks.

Some of the electrical circuitry is carried on the plate 51 of the well, including a switch 68, an indicator light 69, variable resistors 70, 71, and a plug 72 (on bracket 73) for connecting the well to the wiring harness 33.

Figure 4:
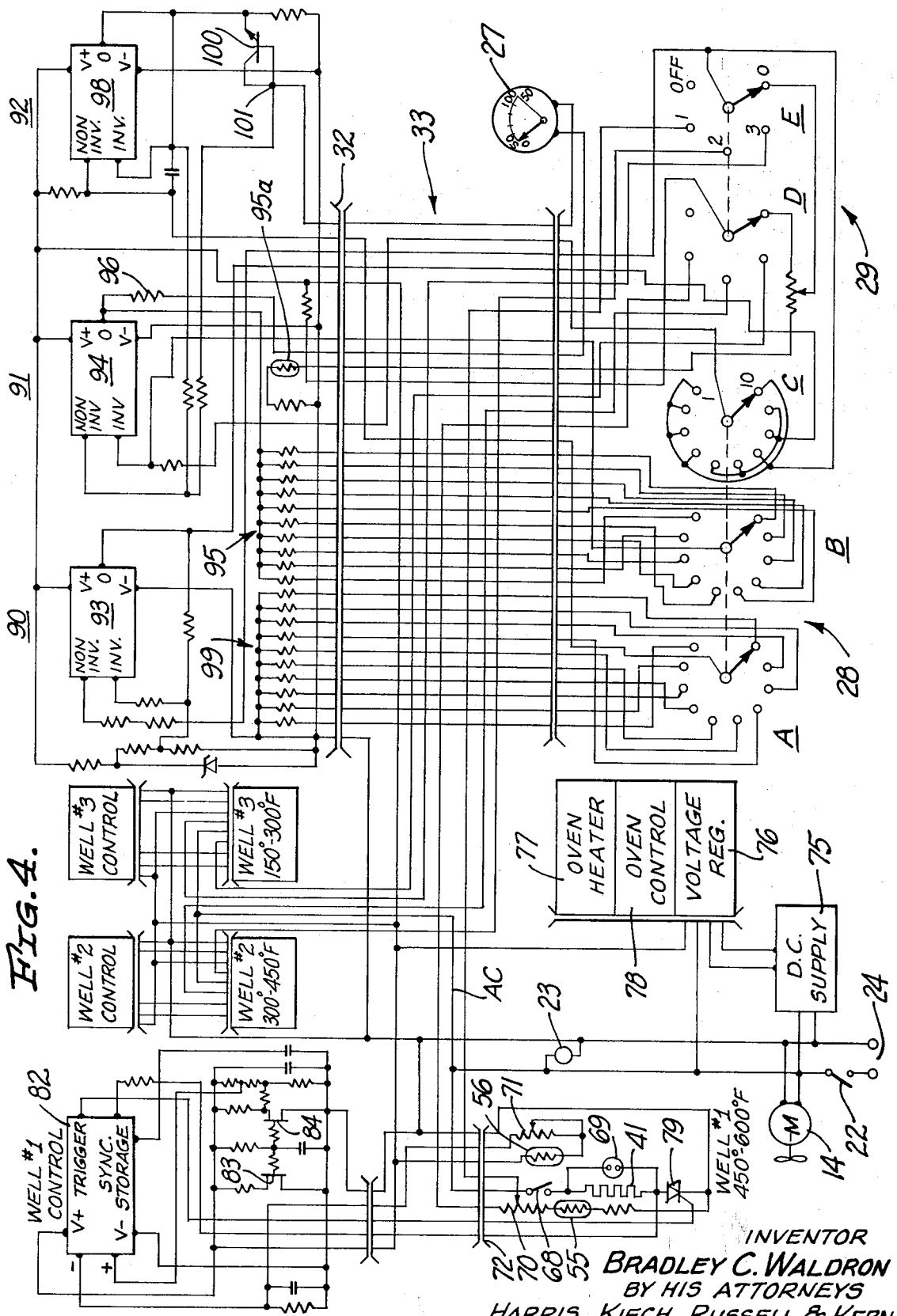
FIG. 4 is an electrical schematic of the instrument of FIG. 1.

The electrical circuitry of the instrument provides a power supply, a temperature control for each of the wells, a temperature control for the oven, and a readout circuit, with most of the circuitry positioned in the oven for operation at a substantially constant temperature. The electrical diagram is presented in FIG. 4, with a number of conventional components illustrated diagrammatically by blocks.

A d.c. power supply 75 is connected to the a.c. input socket 24 through the switch 22. A voltage regulator 76 provides a regulated d.c. source for the circuitry. An electric heater 77 is provided in the oven 30 and is energized from the a.c. supply, with the oven temperature being controlled by an oven control circuit 78 to provide a substantially constant oven temperature, typically about 140°F.

Referring to well No. 1, the heater 41 is energized from the a.c. supply through the switch 68 and a power control device 79, typically a solid state triac, such as an MAC 3–4. The trigger element of the triac 79 is controlled by the trigger output of a conventional proportional control circuit utilizing an integrated circuit unit 82, such as the Fairchild $\mu$A742. The temperature sensitive thermistor 56 is connected in series with the variable resistance 71 and serves as one leg of a bridge circuit for the input of the integrated circuit 82. The control circuit switches the triac 79 on at approximately the zero point of the a.c. line sine wave for minimizing RFI. The proportional control mode is used to prevent temperature overshoot during warm-up. The heater 41 is proportionally controlled by introducing a repetitive ramp function into one leg of the control bridge using a capacitor relaxation oscillator with a unijunction transistor 83, typically a 2N4870. The oscillator output ramp signal is connected to a leg of the bridge through another unijunction transistor 84, typically an FET 2N5463.

The well temperature control circuit is a conventional closed loop circuit and functions to deliver as much power as is needed to maintain the bridge balanced regardless of the environment, heat loss due to the probe being tested, and/or changes in line voltage. The potentiometer 71 which is connected as a variable resistance, provides for adjusting the bridge and setting the temperature of the well. It may be set in the laboratory utilizing a known standard as the temperature probe in the heat sink, and may be set in the field utilizing the readout circuit which will be described hereinbelow.

The readout circuit includes a fixed gain preamplifier 90, a controlled gain temperature signal amplifier 91, and a unity gain temperature reference amplifier 92. The preamplifier 90 is a fixed gain, non-inverting amplifier utilizing an integrated circuit unit 93, typically a Fairchild $\mu$ A741. The signal amplifier 91 is a variable gain inverting amplifier utilizing an integrated circuit unit 94, typically a Fairchild $\mu$ A741 operational amplifier. Switch 28 is a three-deck rotary wafer switch with decks A, B and C. The gain of the amplifier 91 is controlled by deck B which selects one of the resistors 95 for connection in the feedback path from the output of the integrated circuit unit 94 to the inverting input thereof. Switch 28 is a ten position temperature range switch with the ten positions running counterclockwise from 1 to 10, as indicated for deck C. The temperature range is switched in 50° increments, with position 1 being 150° – 200°F. and position 9 550° – 600°F., and with position 10 providing for a readout of the oven temperature.

Deck C of the switch 28 switches the preamplifier 90 in and out of the readout circuitry. For switch positions 1-4, 7 and 10, the temperature sensing elements are connected through deck E of switch 29 to the inverting input of integrated circuit unit 94 of the signal amplifier 91. For switch positions 5, 6, 8 and 9, the temperature sensing elements are connected through deck E of switch 29 to the noninverting input of integrated circuit unit 93 of the preamplifier 90, with the preamplifier output connected to the fixed contact of deck C. The decision on whether or not to utilize the preamplifier depends upon the signal levels from the temperature sensing elements and the gains available in the amplifiers and the output required to drive the meter or other indicating device. The choice may vary depending upon the particular components utilized.

The switch 29 is a five position switch with two decks D and E. The switch positions reading counterclockwise, as indicated at deck E, are off, well No. 1, well No. 2, well No. 3, and oven. The switch functions to connect the temperature sensing elements 70 of each of the wells, and the temperature sensing element 95a of the oven, to the inputs of the amplifiers 90 and 91.

The output of the signal amplifier 91 is connected through a resistor 96 to one terminal of the meter 27, which typically may be a 0–1 milliampere current meter. The reference amplifier 92 is a unity gain amplifier utilizing an integrated circuit unit 98, typically a Fairchild $\mu$ A741 and provides an output voltage which remains substantially constant independent of load, with the magnitude of the output voltage being controlled by deck A of switch 28 which selects one of the resistors 99 for the voltage divider at the noninverting input of the integrated circuit unit 98. A rectifier element 100, such as a diode connected 2N5129 transistor, is connected between the output of the reference amplifier 92 and the other terminal of the meter 27. A feedback connection is provided from the meter-rectifier element junction 101 to the noninverting input of the integrated circuit unit 94 of the signal amplifier 91.

The thermistors which serve as the temperature sensing elements 55 have a resistance-temperature characteristic which is highly nonlinear and which follows an exponential curve. The resistance change per degree is several orders of magnitude different at the upper and lower ends of the temperature scale. At 600°F., the change is in the order of 100 ohms per degree F. and at 150°F., the change is in the order of one hundred thousand ohms per degree F. The meter 27 which indicates temperature is a linear meter and is designed to read a segment of the temperature scale, namely 50°. The readout circuit provides amplification of the temperature signal from the thermistor and also converts this to a linear output and selects a 50° segment of the temperature range for indication at the meter. The monitor switch 29 selects the particular well to be monitored by the meter 27. The range switch 28 selects the particular temperature range and provides the bias or reference input for the amplifier 92 to provide an output corresponding to the low point of the selected temperature segment. The rectifying element 100 is operated in its nonlinear exponential portion and is selected to have a nonlinear function corresponding to the nonlinear function of the temperature sensing thermistors. Positive feedback is provided from the junction 101 to the signal amplifier and provides compensation or linearization of the signal amplifier output.

By way of example consider that it is desired to calibrate a temperature probe at 512°F. The main power switch 22 is turned on and the switch 68 in well No. 1 is turned on, the monitor switch 29 is turned to position 1, and the range switch 28 is turned to position 8 for the 500° – 550° range. The reference amplifier 92 provides an output corresponding to 500°F. As the temperature at well No. 1 increases, the signal from the temperature sensing element 55 decreases and the output from the signal amplifier 91 to the meter 27 increases. When the signal amplifier output is above that corresponding to the 500° temperature, there will be an indication at the meter 27. The current through the meter and the nonlinear diode element 100 provides a nonlinear feedback to the signal amplifier to achieve the desired linearity correction. The potentiometer 70 connected in series with the temperature sensing element 55 provides for initial calibration of the temperature readout and is set utilizing a standard as the temperature probe. When the temperature of the well stabilizes, as indicated by a steady state condition of the meter indication and by a flashing of the light 69, the set point of the well may be adjusted to the desired 512° reading by the variable resistance 71. Flashing of the light 69 indicates that the heater 41 is being turned on and off by the well control circuit for maintaining the well temperature at a constant value. When the well is up to temperature, the light typically may flash in the order of 75 times per minute.

The well temperature control element 56 is positioned in the sleeve 40 between the heater 41 and the heat sink 57. The readout sensing element 55 is similarly positioned. With the sensing element so positioned, the temperature of the sensing elements will be higher than the temperature of the heat sink during the warm-up operation, that is, the temperature of the sensing element goes up faster than does the temperature of the sink. With this arrangement, the heat input to the heat sink from the heater is cut off before the heat sink is up to temperature, thereby reducing the overshoot in temperature. Stated differently, the intermediate position of the thermistor 56 provides anticipation in the heating of the heat sink 57. By positioning the temperature readout thermistor 55 in the same location, the operator is provided with an early indication of the ultimate temperature of the well without having to wait the full warm-up period to determine what is the actual set point. This permits the operator to start fine adjustment of the well temperature to his desired temperature within a short time after turning on the system. By way of example, in one embodiment it requires about 30 minutes for the well to come up to the desired temperature. At the same time, the temperature indicating thermistor and the readout circuitry provide an indication of the set point temperature in about 5 minutes after turning on the system. Going back to our example requiring a test at 512°, after the system is turned on, the operator can note the indicated temperature in 5 or 10 minutes. Suppose the indicated temperature is 540°. This tells the operator that the set point of the well is about 540° and that the well will stabilize at this point in another 20 to 25 minutes. However the operator then adjusts the potentiometer 71 to decrease the temperature slightly. The effect of this change in setting will be indicated in a few minutes and the operator can make another small adjustment in the setting of the potentiometer 71. By following this procedure, the operator can have the well temperature set at the desired figure by the time the well temperature has stabilized. The positioning of the temperature sensing element permits prediction of the ultimate well temperature within a short time after turning on the well heating system.

Each of the wells has its own plug 72 for plugging into the electrical wiring harness 33. The other components, namely the well controls, the oven heater and control, the voltage regulator, the amplifiers and the switches are mounted in the control unit 18 and are connected via plug 32. For purposes of convenience, the plug 32 is shown in several segments in the diagram of FIG. 4.

The embodiment illustrated provides three dry well temperature chambers, each of which may be preset to any desired temperature and each of which may have the temperature set point changed as desired. Three temperature probes may be calibrated at the same time by simply switching the monitor switch 29 from one well to another and by switching the range switch 28 to the appropriate temperature. Also, the three wells may be utilized to calibrate a single temperature probe at three different settings over a wide temperature range, the time required being only that necessary for the probe to stabilize at a new temperature. In a typical instrument, the cavity in the well for receiving the heat sink may be in the order of 1 inch diameter and 5 inch long, thereby accommodating any size of temperature probe up to those maximum dimensions. The heat sinks are designed to provide maximum heat transfer between the sleeve and the temperature probe and are readily replaced for accommodating different sizes of probe. The sleeve and the heat sink serve as the heat transfer medium and are a solid metal, typically steel or aluminum. This eliminates the problem normally encountered with temperature calibration systems utilizing fluid heat transfer mediums, permitting a substantial reduction in weight and providing a system which is readily portable and which can be transported and utilized in any orientation. With a low thermal mass and accurate temperature control, rapid stabilization after initial turn-on and after change in set point are obtained.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim:

1. In a system for providing an accurate temperature for calibration of a temperature probe, the combination of:

a well having a cavity with an electric resistance heater positioned about said cavity and a heat insulator positioned about said heater;

first and second metal heat sinks, with each of said heat sinks positionable within said cavity for sliding insertion and removal for interchanging heat sinks, and each having a central opening for receiving a temperature probe;

a first temperature sensing element mounted in said wall separate from said heat sinks; and a control circuit for energizing said heater for maintaining the temperature of the inserted heat sink substantially constant at a set point and having said first temperature sensing element connected thereto as an input, said control circuit including means for varying said set point.

2. A system as defined in claim 8 including movable cover means of thermal insulating material carried on said well at said open top and overlying said heat sink, with an opening for passage of the temperature probe.

3. A system as defined in claim 2 in which said well includes a finned heat transfer casing for said bottle, and including:

a housing;

means for mounting said well in said housing with said casing spaced from the housing wall; and means for moving air through said housing past said casing.

4. A system as defined in claim 1 including:

a second temperature sensing element mounted in said well; and a readout circuit for indicating the temperature of said heat sink and having said second temperature sensing element connected thereto as an input.

5. A system as defined in claim 4 in which said well includes a metal sleeve defining said cavity with said electric resistance heater wound on said sleeve, and in which said first and second temperature sensing elements are mounted within said sleeve.

6. A system as defined in claim 5 in which said cavity and sleeve are elongate cylinders, and wherein said first and second temperature sensing elements are located adjacent the open end of said cavity and at the same radial distance from the centerline of said cylinders.

7. In a system for providing a plurality of accurate temperatures for calibration of a temperature probe, the combination of:

a housing;

a plurality of wells, each of said wells having a metal sleeve defining a cavity with an electric resistance heater wound on said sleeve about said cavity, a heat insulator positioned about said heater and comprising a vacuum bottle with an open top for receiving said sleeve and heater, a metal heat sink removably positioned within said cavity and having a central opening for receiving the temperature probe, first and second temperature sensing elements mounted in said well, a control circuit for energizing said heater for maintaining the temperature of the heat sink substantially constant at a set point and having said first temperature sensing element connected thereto as an input, said control circuit including means for varying said set point, and means for removably mounting each of said wells in said housing and spaced from the housing wall;

a readout circuit for indicating the temperatures of said heat sinks; and means for selectively connecting each of said second temperature sensing elements as inputs to said readout circuit.

8. In a system for providing an accurate temperature for calibration of a temperature probe, the combination of:

a well having a metal sleeve defining a cavity with an electric resistance heater wound on said sleeve about said cavity and a heat insulator positioned about said heater and including a vacuum bottle with an open top for receiving said sleeve and heater;

a metal heat sink removably positioned within said cavity and having a central opening for receiving the temperature probe;

a first temperature sensing element mounted in said well; and a control circuit for energizing said heater for maintaining the temperature of said heat sink substantially constant at a set point and having said first temperature sensing element connected thereto as an input, said control circuit including means for varying said set point.

9. In a system for providing an accurate temperature for calibration of a temperature probe, the combination of:

a well having a cavity with an electric resistance heater positioned about said cavity and a heat insulator positioned about said heater;

a metal heat sink, removably positioned within said cavity and having a central opening for receiving the temperature probe;

a first temperature sensing element mounted in said well;

a control circuit for energizing said heater for maintaining the temperature of said heat sink substantially constant at a set point and having said first temperature sensing element connected thereto as an input, said control circuit including means for varying said set point;

a second temperature sensing element mounted in said well, with the impedance thereof varying nonlinearly as a first function of a temperature; and a readout circuit for indicating the temperature of said heat sink and having said second temperature sensing element connected thereto as an input, said readout circuit including a linear meter for indicating a segment of the temperature scale;

a rectifier element having an impedance varying nonlinearly as a second function of voltage, with said second function corresponding to said first function;

first signal amplifier means with a preset gain and having an input and an output;

second temperature reference amplifier means having a preset output maintained substantially constant with varying load;

means for presetting the output of said second amplifier means to a temperature value to provide an output defining the low end of said meter segment;

circuit means for connecting said second temperature sensing element to said first amplifier means input;

circuit means for connecting said meter and said rectifier element in series between the outputs of said first and second amplifier means; and circuit means for connecting a feedback signal from the meter-rectifier element junction to the input of said first amplifier means.

10. A system as defined in claim 1 in which said well includes a metal sleeve defining said cavity with said electric resistance heater wound on said sleeve, and including movable cover means of thermal insulating material carried on said well at the top thereof and overlying said heat sink, with an opening for passage of the temperature probe.

* * * * *